United States Patent
Chang et al.

(10) Patent No.: US 10,943,052 B2
(45) Date of Patent: Mar. 9, 2021

(54) INTEGRATED CIRCUIT DESIGN METHOD, SYSTEM AND COMPUTER PROGRAM PRODUCT

(71) Applicant: TAIWAN SEMICONDUCTOR MANUFACTURING COMPANY LTD., Hsinchu (TW)

(72) Inventors: Chi-Wen Chang, Yuanlin Township (TW); Jui-Feng Kuan, Zhubei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/566,570

(22) Filed: Sep. 10, 2019

(65) Prior Publication Data

US 2020/0125696 A1      Apr. 23, 2020

Related U.S. Application Data

(60) Provisional application No. 62/749,445, filed on Oct. 23, 2018.

(51) Int. Cl.
| G06F 30/398 | (2020.01) |
| G06F 30/394 | (2020.01) |
| G03F 1/36 | (2012.01) |
| G03F 1/70 | (2012.01) |

(52) U.S. Cl.
CPC ........... *G06F 30/398* (2020.01); *G03F 1/36* (2013.01); *G03F 1/70* (2013.01); *G06F 30/394* (2020.01)

(58) Field of Classification Search
CPC . G03F 1/36; G03F 1/70; G06F 30/394; G06F 30/398
See application file for complete search history.

(56) References Cited

U.S. PATENT DOCUMENTS

| | | | |
|---|---|---|---|
| 7,260,442 B2 | 8/2007 | Hwang et al. | |
| 7,283,942 B1* | 10/2007 | Lewis | G06F 30/367 703/14 |
| 9,256,709 B2 | 2/2016 | Yu et al. | |
| 2014/0007031 A1* | 1/2014 | Huang | G06F 30/367 716/112 |
| 2014/0040838 A1 | 2/2014 | Liu et al. | |
| 2015/0278429 A1 | 10/2015 | Chang | |
| 2018/0341742 A1* | 11/2018 | Yazdani | G06F 30/331 |

* cited by examiner

*Primary Examiner* — Vuthe Siek
(74) *Attorney, Agent, or Firm* — Hauptman Ham, LLP

(57) ABSTRACT

A method includes assigning a default voltage value of a voltage domain in an integrated circuit (IC) schematic to a net in the voltage domain, generating a simulation voltage value of the net by performing a circuit simulation on the net, and modifying the IC schematic to include a voltage value associated with the net, based on the simulation voltage value of the net.

20 Claims, 8 Drawing Sheets

| Name | Signal Type | Vmax(V) | Vmin(V) |
|---|---|---|---|
| VDD33 | POWER | 3.3 | 3.3 |
| VDD25 | POWER | 2.5 | 2.5 |
| VDD15 | POWER | 1.5 | 1.5 |
| VSS | GROUND | 0 | 0 |
| VIN | INPUT | 1.5 | 0 |
| VREF | INPUT | 1.2 | 0 |

| Name | Vmax(V) | Simulation Voltage (V) | Revised Voltage (V) |
|---|---|---|---|
| VDD33 | 3.3 | 3.3 | |
| VDD25 | 2.5 | 2.5 | |
| VDD15 | 1.5 | 1.5 | |
| VSS | 0 | 0 | |
| VIN | 1.5 | 1.5 | |
| VREF | 1.2 | 1.2 | |
| BG_OUT_1P2V | 3.3 | 1.2 | 1.2 |
| LDO_OUT_1P5V | 2.5 | 1.5 | 1.5 |

INTEGRATED CIRCUIT DESIGN METHOD, SYSTEM AND COMPUTER PROGRAM PRODUCT

PRIORITY CLAIM

The instant application claims the benefit of U.S. Provisional Application No. 62/749,445, filed Oct. 23, 2018, the entirety of which is incorporated by reference herein.

BACKGROUND

An integrated circuit (IC) typically includes a number of semiconductor devices represented in an IC layout diagram. The IC layout diagram is generated from an IC schematic, such as an electrical diagram of the IC. At various steps during the IC design process, from the IC schematic to the IC layout diagram for actual manufacture of the IC, various checking and testing are performed to make sure that the IC can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
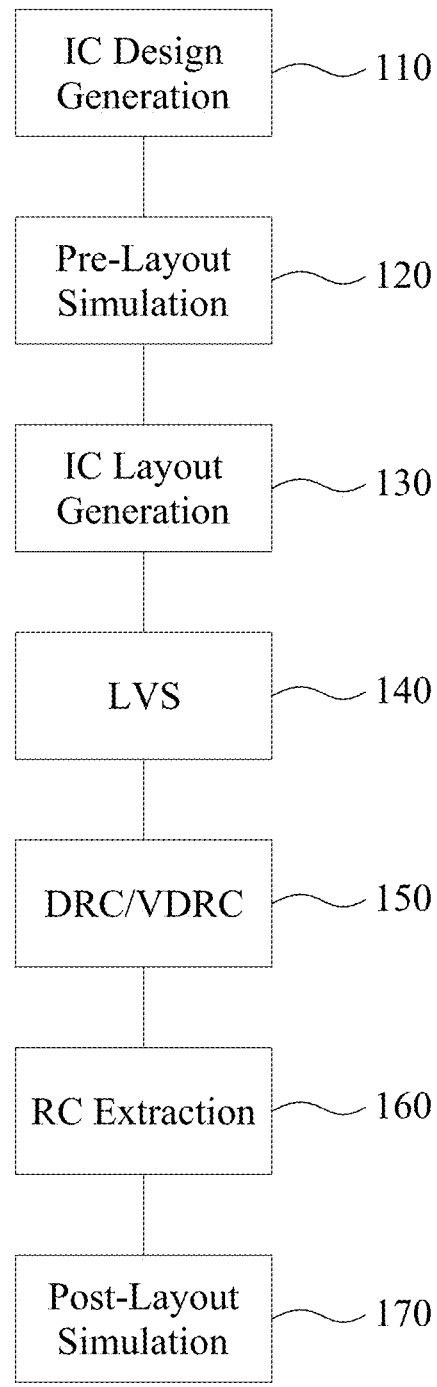
FIG. 1 is a functional flow chart of at least a portion of an IC design flow in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an IC design process, one or more pre-manufacturing verifications use voltage information associated with various circuit elements and/or nets in an IC schematic of an IC. The manufacturability of the IC and/or functionality of the manufactured IC depend to some extent on the accuracy of the one or more pre-manufacturing verifications, which, in turn, depend on the accuracy and/or completeness of the voltage information associated with the circuit elements and/or nets in the IC schematic of the IC. In some embodiments, nets in a voltage domain of an IC schematic are automatically assigned a default voltage value corresponding to the voltage domain. A circuit simulation is performed to obtain simulation voltage values for the nets. For a net where the assigned default voltage value and the corresponding simulation voltage value differ by more than a predetermined tolerance, the voltage value assigned to the net is revised, e.g., by a user or IC designer, and the IC schematic is modified to include the revised voltage value. As a result, in at least one embodiment, full and accurate voltage assignment for nets in the IC schematic is achievable, which in turn, improve the accuracy of subsequent pre-manufacturing verifications and/or manufacturability of the IC and/or functionality of the manufactured IC.

FIG. 1 is a functional flow chart of at least a portion of an IC design flow 100 in accordance with some embodiments. The design flow 100 utilizes one or more electronic design automation (EDA) tools for testing a design of an IC before manufacturing the IC. The EDA tools, in some embodiments, are one or more sets of executable instructions for execution by a processor or controller or a programmed computer to perform the indicated functionality. In at least one embodiment, the IC design flow 100 is performed by a design house of an IC manufacturing system discussed herein with respect to FIG. 6.

At operation 110, a design of an IC is provided by a circuit designer. In some embodiments, the design of the IC includes an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments.

At operation 120, a pre-layout simulation is performed, e.g., by an EDA tool, on the design to determine whether the design meets a predetermined specification. If the design does not meet the predetermined specification, the IC is redesigned. In some embodiments, a SPICE simulation is performed on the SPICE netlist. Other simulation tools are usable, in place of or in addition to the SPICE simulation, in other embodiments.

At operation 130, a layout (or layout diagram) of the IC is generated based on the design. In some embodiments, the layout is generated in the form of a Graphic Design System (GDS) file by an EDA tool. Other tools and/or data formats for describing the layout are usable in other embodiments.

At operation 140, a layout-versus-schematic (LVS) check, is performed. The LVS check is performed to ensure that the generated layout corresponds to the design. Specifically, an LVS checking tool, i.e., an EDA tool, recognizes electrical components as well as connections therebetween from the pattern of the generated layout. The LVS checking tool then generates a layout netlist representing the recognized electrical components and connections. The layout netlist generated from the layout is compared, by the LVS checking tool, with the schematic netlist of the design. If the two netlists match within a matching tolerance, the LVS check is passed. Otherwise, correction is made to at least one of the layout or the design by returning the process to operation 110 and/or operation 130.

At operation 150, a design rule check (DRC) is performed, e.g., by an EDA tool, on the GDS file representing the layout, to ensure that the layout satisfies certain manufacturing design rules, i.e., to ensure manufacturability of the IC. If one or more design rules is/are violated, correction is made to at least one of the layout or the design by returning the process to operation 110 and/or operation 130. Examples of design rules include, but are not limited to, a width rule which specifies a minimum width of a pattern in the layout, a spacing rule which specifies a minimum spacing between adjacent patterns in the layout, an area rule which specifies a minimum area of a pattern in the layout, or the like.

In one or more embodiments, at least one of the design rules is voltage-dependent. For example, a metal-to-via spacing rule specifies a minimum spacing between a metal pattern and an adjacent via in the layout of the IC. In some embodiments, such a minimum spacing is dependent on a voltage expected or predicted to occur at the metal pattern or the via during an operation of the IC. Examples of further voltage-dependent design rules include, but are not limited to, metal-to-metal spacing rule, polysilicon-to-oxide definition (PO-to-OD) spacing rule, PO-to-PO spacing rule, etc. A DRC that is performed to check compliance of a layout with one or more voltage-dependent design rules is referred to as a VDRC.

At operation 160, a resistance and capacitance (RC) extraction is performed, e.g., by an EDA tool, to determine parasitic parameters, e.g., parasitic resistance and parasitic capacitance, of interconnects in the IC layout for timing simulations in a subsequent operation. Other verification processes are usable in other embodiments.

At operation 170, a post-layout simulation is performed by a simulation tool, i.e., an EDA tool, to determine, taking the extracted parasitic parameters into account, whether the layout meets a predetermined specification. If the simulation indicates that the layout does not meet the predetermined specification, e.g., if the parasitic parameters cause undesirable delays, correction is made to at least one of the layout or the design by returning the process to operation 110 and/or operation 130. Otherwise, the layout is passed to manufacture or additional verification processes. In some embodiments, one or more of the above-described operations are omitted. For example, the RC extraction in operation 160 and the post-layout simulation in operation 170 are omitted in one or more embodiments. The pre-layout simulation in operation 120 or the post-layout simulation in operation 170 is omitted in one or more embodiments.

In some embodiments, voltage data for one or more patterns in the layout of an IC are used in a VDRC as described with respect to operation 150. In at least one embodiment, such voltage data are obtained from the IC schematic. The inclusion of voltage data, also referred to as "voltage tagging" or "voltage assignment," in association with circuit elements and/or nets in an IC schematic is achieved in some embodiments as described herein.

Figures 2A, 2B:
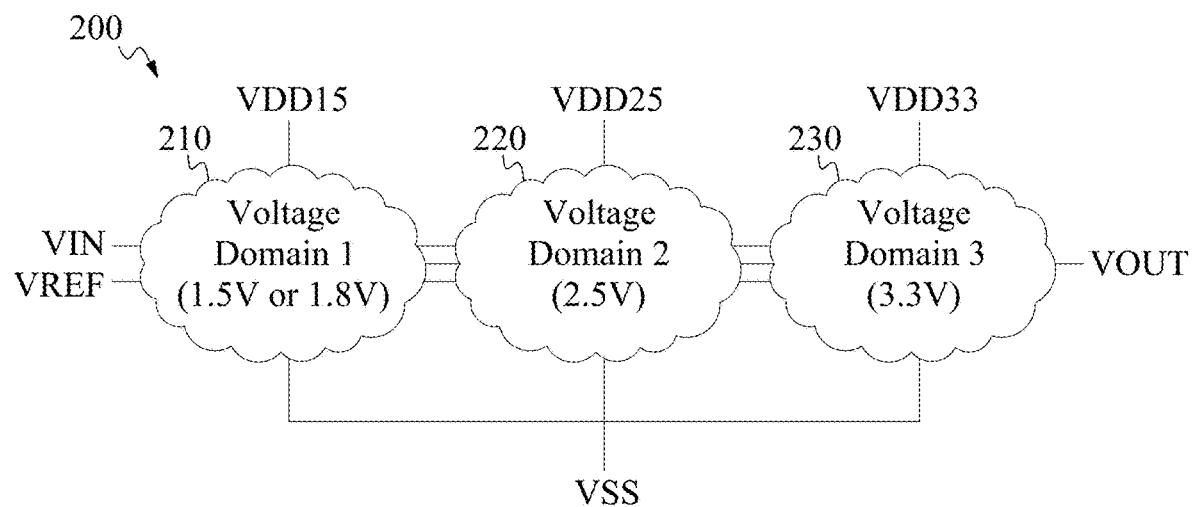
FIG. 2A is a schematic view of an IC schematic, in accordance with some embodiments.
FIG. 2B is a schematic view of a user interface showing various voltages in the IC schematic of FIG. 2A, in accordance with some embodiments.

FIG. 2A is a schematic view of an IC schematic 200, in accordance with some embodiments. In at least one embodiment, IC schematic 200 is outputted by operation 110 described with respect to FIG. 1.

IC schematic 200 includes a plurality of circuit elements and a plurality of nets. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), FinFETs, planar MOS transistors with raised source/drains, or the like. Examples of passive elements include, but are not limited to, capacitors, inductors, fuses, and resistors. Examples of nets include, but are not limited to, vias, conductive pads, conductive traces, and conductive redistribution layers. Specific examples of circuit elements and nets are described with respect to FIGS. 3A, 3C and 3D.

IC schematic 200 further includes a plurality of voltage domains 210, 220, 230 having different power supply voltages. The circuit elements and nets of IC schematic 200 are distributed among voltage domains 210, 220, 230, such that circuit elements and nets in a voltage domain are coupled to a power supply voltage corresponding to the voltage domain. In the example configuration in FIG. 2A, circuit elements in voltage domain 210 are coupled to power supply voltage VDD15 of voltage domain 210, circuit elements in voltage domain 220 are coupled to power supply voltage VDD25 of voltage domain 220, and circuit elements in voltage domain 230 are coupled to power supply voltage VDD33 of voltage domain 230. Power supply voltage VDD15 is about 1.5V or 1.8V, power supply voltage VDD25 is about 2.5V, and power supply voltage VDD33 is about 3.3V. All voltage domains 210, 220, 230 share the same ground voltage VSS of 0V. The described number of voltage domains and/or specific power supply voltages and/or specific ground voltage of the voltage domains are examples. Other configurations are within the scopes of various embodiments.

At least one input signal VIN is inputted to IC schematic 200. At least one reference signal VREF is inputted to IC schematic 200 and/or generated by IC schematic 200. In some situations, reference signal VREF is also considered as a type of input signal. The circuit elements and nets of IC schematic 200 are designed and coupled into one or more circuits to process input signal VIN, using the power supply by voltage domains 210, 220, 230 and reference signal VREF, to output at least one output signal VOUT. During the design phase, voltage values of various power supply voltages and input signals are designated and/or confirmed by a user, e.g., an IC designer.

FIG. 2B is a schematic view of a user interface 240 showing various voltages in IC schematic 200 of FIG. 2A, in accordance with some embodiments. In one or more embodiments, user interface 240 is presented on a screen of a display. Other output devices for presenting user interface 240 to a user are within the scopes of various embodiments. In at least one embodiment, user interface 240 further includes an input device, e.g., a keyboard or touchscreen, to receive user inputs. Other input devices are within the scopes of various embodiments.

In the example configuration in FIG. 2B, user interface 240 is in the form of a table having multiple columns 250, 260, 270, 280. Column 250 includes names (or identifiers) of power or signal voltages to be designated or confirmed by a user, column 260 includes signal types of the voltages, column 270 includes maximum voltage values (Vmax) of the voltages, and column 280 includes minimum voltage values (Vmin) of the voltages. Specifically, the voltage domains 230, 220, 210 are listed by their identifiers VDD33, VDD25, VDD15, respectively, in column 250, and all have the power signal type in column 260. The ground voltage is listed by its identifier VSS in column 250, and has the ground signal type in column 260. The input signal and reference signal are listed by their identifiers VIN, VREF, respectively, in column 250, and all have the input signal type in column 260. The described tabular format of user interface 240, number, identifiers and signal types of various voltages are examples. Other configurations are within the scopes of various embodiments.

A user designates and/or confirms voltage values in columns 270, 280. In at least one embodiment, one or more of the voltage values in columns 270, 280 are automatically read, e.g., by a processor as described herein, from a file, such as a common power format (CPF) file. The voltage values read from the CPF file are presented in columns 270, 280 of user interface 240 for confirmation by a user. In at least one embodiment, one or more of the voltage values in columns 270, 280 are entered by a user. In the example configuration in FIG. 2B, each of power supply voltages VDD33, VDD25, VDD15 and ground voltage VSS has the same Vmax and Vmin at 3.3V, 2.5V, 1.5V and 0V, respectively. Other configurations in which at least one of the power supply voltages and ground voltage has different Vmax and Vmin are within the scopes of various embodiments. Input signal VIN and reference signal VREF have Vmax at 1.5V and 1.2V, respectively, and both have Vmin at 0V. Other configurations are within the scopes of various embodiments. In at least one embodiment, voltage values for the power supply voltages, ground voltage and input signals are assigned automatically without user intervention.

Figures 3A, 3B:
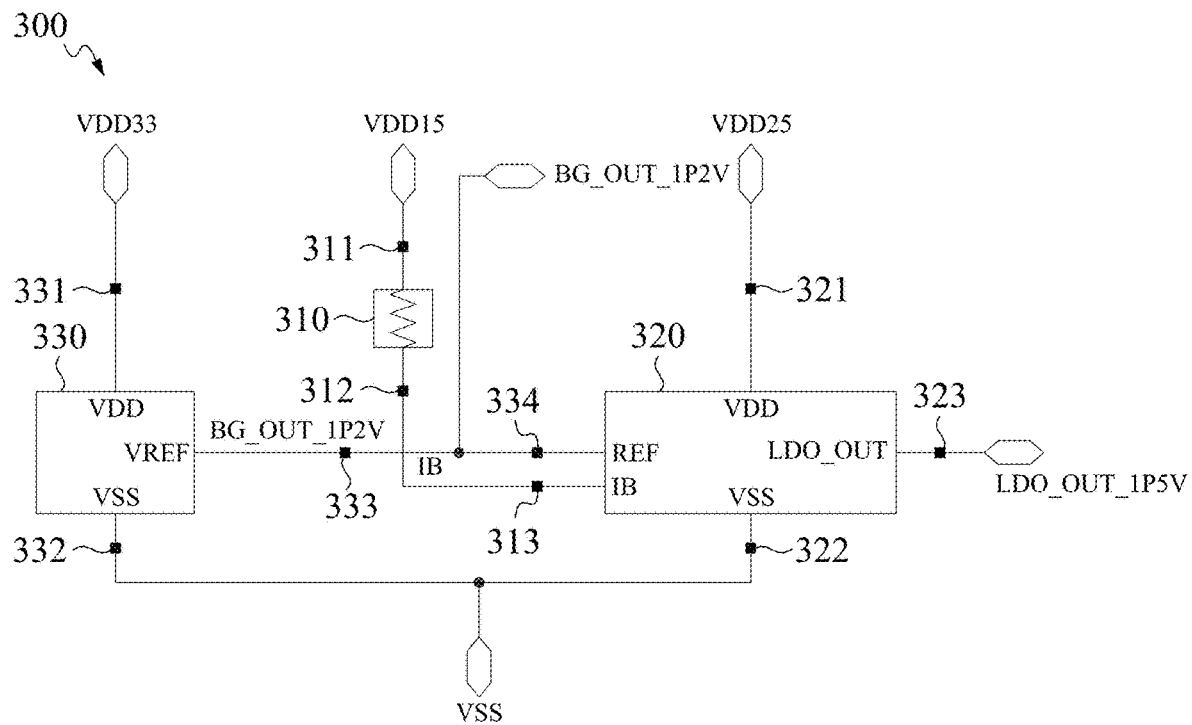
FIG. 3A is a schematic view of an IC schematic, in accordance with some embodiments.
FIG. 3B is a schematic view of a user interface showing various voltages in the IC schematic of FIG. 3A, in accordance with some embodiments.

FIG. 3A is a schematic view of an IC schematic 300, in accordance with some embodiments. In at least one embodiment, IC schematic 300 corresponds to at least a part of IC schematic 200.

IC schematic 300 comprises a resistor 310, a low dropout regulator 320, and a bandgap reference circuit 330. IC schematic 300 includes three voltage domains having corresponding different power supply voltages VDD15, VDD25, VDD33, respectively. For simplicity, each voltage domain and the corresponding power supply voltage are commonly referred to herein by the same identifier, i.e., VDD15, VDD25 or VDD33. In at least one embodiment, power supply voltages VDD15, VDD25, VDD33 of IC schematic 300 correspond to power supply voltages VDD15, VDD25, VDD33 of IC schematic 200, respectively, and voltage domains VDD15, VDD25, VDD33 of IC schematic 300 correspond to voltage domains 210, 220, 230 of IC schematic 200, respectively.

Resistor 310 has an end 311 is coupled to power supply voltage VDD15 of voltage domain VDD15. Another end 312 of resistor 310 is coupled via a net D3 to a node 313 which defines an input D3 of low dropout regulator 320. Resistor 310 is an example of a circuit element in voltage domain VDD15.

Bandgap reference circuit 330 has a power supply terminal VDD, a ground terminal VSS, and an output VREF defined by nodes 331, 332 and 333, respectively. Node 331 is coupled to power supply voltage VDD33 of voltage domain VDD33. Node 332 is coupled to ground voltage VSS. Node 333 is coupled via a net BG_OUT_1P2V to a node 334 which defines an input REF of low dropout regulator 320. Net BG_OUT_1P2V is also coupled to a node BG_OUT_1P2V. Bandgap reference circuit 330 is an example of a circuit in voltage domain VDD33. Bandgap reference circuit 330 is configured to generate, at output VREF, a band-gap reference voltage which remains substantially constant over a predetermined temperature range and/or despite variations in power supply voltage VDD33.

Figure 3C:
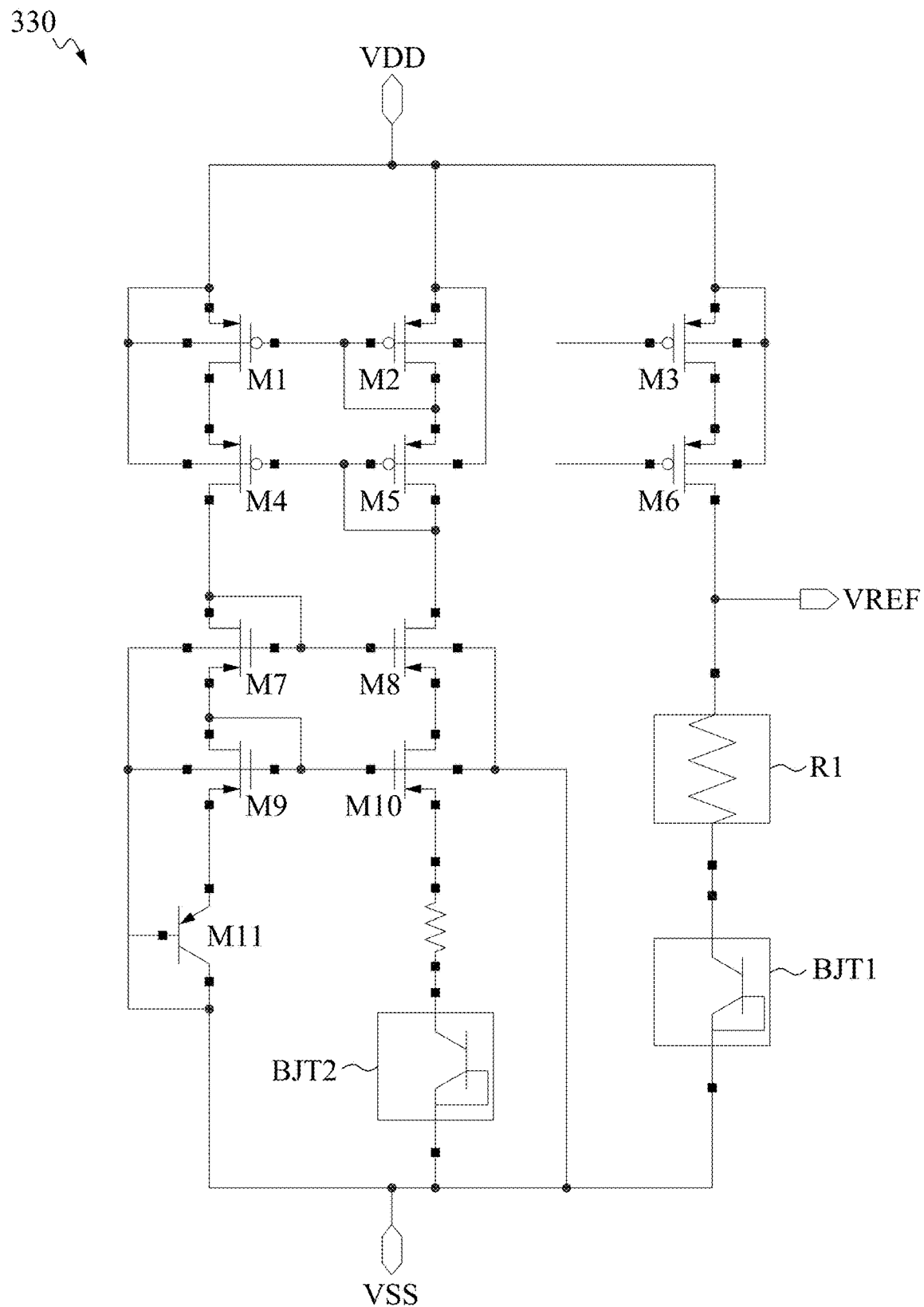
FIGS. 3C and 3D are circuit diagrams of various circuits in the IC schematic of FIG. 3A, in accordance with some embodiments.

An example configuration of bandgap reference circuit 330 is given in FIG. 3C. In this example configuration, bandgap reference circuit 330 includes a plurality of MOS transistors M1-M11, a resistor R1, and BJT transistors BJT1, BJT2. Transistors M1-M11, BJT1, BJT2 and resistor R1 are example of circuit elements in voltage domain VDD33. A plurality of nets (not numbered) couple the transistors and resistor in bandgap reference circuit 330. Such nets in bandgap reference circuit 330 and net BG_OUT_1P2V are examples of nets in voltage domain VDD33. Other configurations of bandgap reference circuit 330 are within the scopes of various embodiments.

Low dropout regulator 320 has a power supply terminal VDD, a ground terminal VSS, inputs IB and REF, and an output LDO_OUT defined by nodes 321, 322, 313, 334 and 323, respectively. Node 321 is coupled to power supply voltage VDD25 of voltage domain VDD25. Node 322 is coupled to ground voltage VSS. Node 323 is coupled to a node LDO_OUT_1P5V which is also referred to as net LDO_OUT_1P5V. Low dropout regulator 320 is an example of a circuit in voltage domain VDD25. Low dropout regulator 320 is a DC linear voltage regulator configured to regulate the output voltage at node LDO_OUT_1P5V even when power supply voltage VDD25 is close to the output voltage.

Figure 3D:
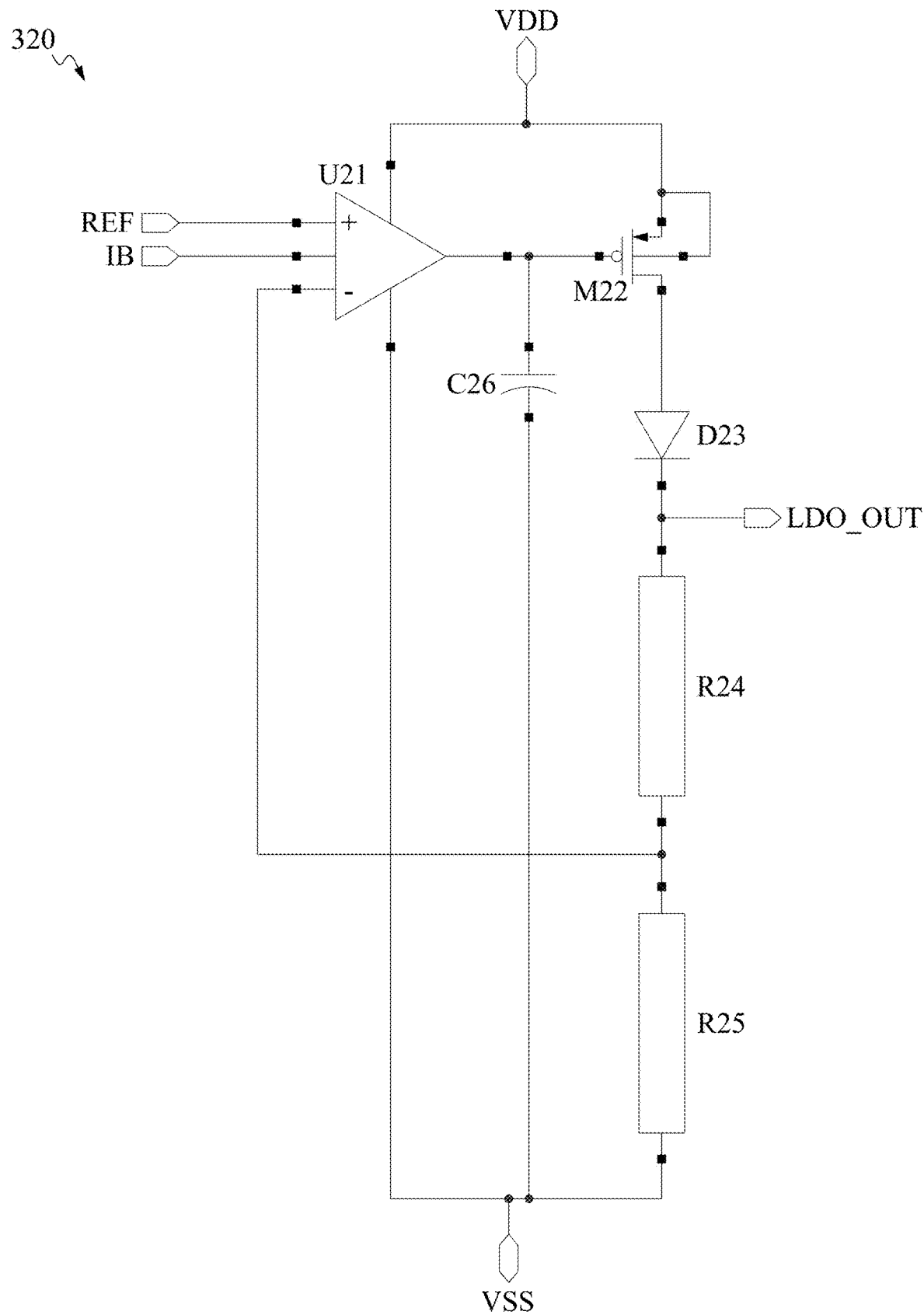

An example configuration of low dropout regulator 320 is given in FIG. 3D. In this example configuration, low dropout regulator 320 includes an operational amplifier U21, a MOS transistor M22, a diode D23, resistors R24, R25 and a capacitor C26, which are example of circuit elements in voltage domain VDD25. A plurality of nets (not numbered) couple the circuit elements in low dropout regulator 320. Such nets in low dropout regulator 320 and net LDO_OUT_1P5V are examples of nets in voltage domain VDD25. Other configurations of low dropout regulator 320 are within the scopes of various embodiments. In IC schematic 300, nets coupled to power supply terminals, such as VDD33, VDD25, VDD15 and VSS are referred to as power supply nets, and other nets are referred to as signal nets. Examples of signal nets include net BG_OUT_1P2V and net LDO_OUT_1P5V.

FIG. 3B is a schematic view of a user interface 340 showing various voltages in IC schematic 300 of FIG. 3A, in accordance with some embodiments. In one or more embodiments, user interface 340 corresponds to user interface 240 described with respect to FIG. 2B.

In the example configuration in FIG. 3B, user interface 340 is in the form of a table having multiple columns 350, 370, 372, 374. Column 350 includes names (or identifiers) of various voltages or nets and column 370 includes maximum voltage values (Vmax) of the voltages or nets. Similarly to user interface 240 described with respect to FIG. 2B, Vmax of power supply voltages VDD33, VDD25, VDD15, ground voltages VSS and input voltages VIN, VREF are designated and/or confirmed by a user.

However, besides the power supply voltages, ground voltages and input voltages, voltage values of various nets in IC schematic 300 are also tagged for design and/or verification purposes as described herein. For complex circuitry, there is a large number of nets voltage values of which are to be tagged. Manual entry of voltage values by a human designer for such a large number of nets involves risks of voltage inaccuracy and/or incomplete voltage tagging where one or more nets are missed and not voltage-tagged due to human error. The described risks are avoidable or at least reduced in some embodiments described herein.

In some embodiments, each of the nets to be voltage-tagged is automatically assigned with a default voltage value corresponding to the voltage domain of the net. For example, in IC schematic 300, net BG_OUT_1P2V to be voltage-tagged is assigned with a default voltage value corresponding to voltage domain VDD33 of net BG_OUT_1P2V. In the example configuration in FIG. 3B, the default voltage value assigned to net BG_OUT_1P2V includes a Vmax of 3.3V corresponding to power supply voltage VDD33 of the voltage domain of net BG_OUT_1P2V. The default voltage value assigned to net BG_OUT_1P2V further includes a Vmin of 0V (not shown in FIG. 3B) corresponding to ground voltage VSS. Similarly, net LDO_OUT_1P5V to be voltage-tagged is assigned with a default voltage value corresponding to voltage domain VDD25 of net LDO_OUT_1P5V. The default voltage value assigned to net LDO_OUT_1P5V includes a Vmax of 2.5V corresponding to power supply voltage VDD25 of the voltage domain of net LDO_OUT_1P5V, and a Vmin of 0V (not shown in FIG. 3B) corresponding to ground voltage VSS.

The described assignment of the power supply voltage of the corresponding voltage domain and ground voltage as Vmax and Vmin of the default voltage value for each net is an example. Other configurations, in which Vmax or Vmin of the default voltage value assigned to each net are different from the power supply voltage of the corresponding voltage domain or ground voltage, are within the scopes of various embodiments. For example, in at least one embodiment, Vmax of the default voltage value assigned to each net is determined from the power supply voltage of the corresponding voltage domain and a predetermined percentage, e.g., 95% of VDD33, to account for voltage drop and/or voltage fluctuation. In at least one embodiment, the default voltage value assigned to a net represents the worst case scenario at the net during operation of an IC manufactured based on IC schematic 300.

Once all nets to be voltage-tagged have been assigned default voltage values corresponding to the voltage domains of the nets, a circuit simulation is performed, using the assigned default voltage values and the designated voltage values of the power supply voltages, ground voltage and input signals, as shown, for example, in column 370 of user interface 340. In at least one embodiment, the circuit simulation is performed globally for the whole IC schematic 200 of which IC schematic 300 is a part. In at least one embodiment, the circuit simulation is performed locally on the nets to be voltage-tagged. For example, the circuit simulation is performed locally on IC schematic 300 with net BG_OUT_1P2V and net LDO_OUT_1P5V to be voltage-tagged. In at least one embodiment, the circuit simulation is performed at operation 120 described with respect to FIG. 1.

As a result of the circuit simulation, a simulation voltage value is obtained for each net to be voltage-tagged. For example, user interface 340 in FIG. 3B indicates at column 372 that a simulation voltage value of 1.2V for net BG_OUT_1P2V and a simulation voltage value of 1.5V for net LDO_OUT_1P5V are generated by the circuit simulation.

The simulation voltage value and the default voltage value of each net are compared to determine a difference therebetween. When the difference between the simulation voltage value and the default voltage value of a net (also referred to as "overkill net") is greater than a predetermined tolerance, for example, 5%, the voltage value assigned to the net is revised. For example, in FIG. 3B, the difference between the simulation voltage value of 1.2V and the assigned default voltage value of 3.3V for net BG_OUT_1P2V is greater than the predetermined tolerance, and a user specifies a revised voltage value of 1.2V for net BG_OUT_1P2V in column 374. The difference between the simulation voltage value of 1.5V and the assigned default voltage value of 2.5V for net LDO_OUT_1P5V is greater than the predetermined tolerance, and the user specifies a revised voltage value of 1.5V for net LDO_OUT_1P5V in column 374. For a net where the difference between the simulation voltage value and the default voltage value is not greater than the predetermined tolerance, no voltage value revision is performed, and the initially assigned default voltage value remains unchanged.

In some embodiments, a user is prompted, e.g., via user interface 340, to revise the voltage value assigned to an overkill net when the difference between the simulation voltage value and the default voltage value of the net is greater than the predetermined tolerance. In an example, the net identifier, the default voltage value, and the simulation voltage value of the overkill net are outputted to user interface 340. The overkill net to be revised is highlighted on user interface 340, e.g., by color, frame etc., to be visually different from other nets that are not to be revised. In a further example, only the overkill nets to be revised are outputted to and presented by user interface 340, whereas other nets that are not to be revised are not outputted to and presented by user interface 340. As a result, it is possible to direct the user's attention to the overkill nets to be revised, thereby reducing time and error, especially in complex IC schematics with hundreds or thousands of nets to be voltage-tagged.

Although in the above described example, the user simply selects the simulation voltage value (e.g., 1.2V for net BG_OUT_1P2V) as the revised voltage value to be tagged to the net, other arrangements are within the scopes of various embodiments. For example, in at least one embodiment, the user enters a voltage value based on his or her expertise, as well as at least one of the simulation voltage value (e.g., 1.2V for net BG_OUT_1P2V) and the default voltage value (e.g., 3.3V for net BG_OUT_1P2V).

Although in the above described example, the voltage value assigned to an overkill net is revised by a user, other arrangements are within the scopes of various embodiments. For example, in at least one embodiment, the voltage value assigned to an overkill net is automatically revised, e.g., by a processor as described herein. In an example, the automatically revised voltage value is the same as the simulation voltage value. In a further example, the automatically revised voltage value is a voltage value determined from at least one of the simulation voltage value and the default voltage value, and based on a predetermined algorithm or calculation.

In at least one embodiment, the revised voltage value (e.g., 1.2V in column 374 of user interface 340 for net BG_OUT_1P2V) replaces the default voltage value (e.g., 3.3V in column 370 of user interface 340 for net BG_OUT_1P2V), and the circuit simulation is performed again using the revised voltage value to confirm that a new simulation voltage value is within the predetermined tolerance of the revised voltage value. Further voltage revision is performed if needed, and the described process is repeated until no overkill nets are present. When the presence of an overkill net is still observed after a predetermined number of circuit simulations, the IC schematic is re-designed, e.g., at operation 110 described with respect to FIG. 1.

In at least one embodiment, the revised voltage values of nets that were found to be overkill nets and subsequently revised, and the default voltage values of the nets that were found to not be overkill nets, are included in the IC schematic to obtained a modified IC schematic. A form of voltage-tagging is to include, in or with the IC schematic, a table including the net identifiers and the corresponding voltage values, similar to columns 350 and 372 in user interface 340. Other voltage-tagging configurations are within the scopes of various embodiments.

In at least one embodiment, the modified IC schematic is stored in a non-transitory, computer readable storage medium, for access by an EAD tool. In at least one embodiment, the modified IC schematic is stored in the same non-transitory, computer readable storage medium from which the initial IC schematic was read out for voltage tagging.

In at least one embodiment, the modified IC schematic with the tagged voltages is used to generate a corresponding IC layout diagram with corresponding tagged voltages, for example, as described with respect to operation 130 in FIG. 1. The tagged voltages are used in a voltage-dependent verification, such as VDRC, of the IC layout diagram, for example, as described with respect to operation 150 in FIG. 1.

In some embodiments, all nets in an IC schematic are assigned with corresponding default voltage values, and one or more of such default voltage values are subsequently revised based on corresponding simulation voltage values obtained from a circuit simulation. As a result, all nets in the IC schematic have associated voltage values, which are either the default voltage values or voltage values revised based on the circuit simulation. A modified IC schematic with a full voltage assignment to all nets and accurate voltage data updated by circuit simulation is obtained. As a voltage-dependent verification of the modified IC schematic and/or an IC layout diagram corresponding to the modified IC schematic is performed using the full and accurate voltage assignment included in the modified IC schematic, the accuracy of such voltage-dependent verification is improved over other approaches where the voltage assignment is incomplete and/or inaccurate due to manual tagging and/or human error.

In some embodiments, the default voltage values assigned to the nets in an IC schematic represent the worst case scenario at the nets during operation of a manufactured IC. A subsequent circuit simulation permits the default voltage values to be revised, if needed, based on corresponding simulation voltage values to bring the nets associated with the revised voltage values closer to their real operational conditions. As a result, it is possible to ensure that an manufactured IC will operate as designed in real operational conditions.

Some other approaches provide no solution, other than manual voltage-tagging, for assigning voltage values to nets inside a physical cell of an IC schematic. A physical cell is a cell configured to provide a function, other than a logic function, to an IC incorporating such physical cell. The circuit of IC schematic 300 in FIG. 3A is an example of a physical cell. In some embodiments, by automatically assigning default voltage values to nets inside a physical cell and revising, if needed, the default voltage values based on corresponding simulation voltage values, the described disadvantage of the other approaches is avoided.

Some embodiments, therefore, provide IC design methods and systems in which a full voltage assignment is tagged to nets of an IC schematic to enable a subsequent VDRC on a corresponding IC layout diagram, with higher accuracy and efficiency than when voltage data are manually and/or incompletely entered. In one or more embodiments, the voltage assignment is entirely automatic. In one or more embodiments, the voltage assignment is partially automatic and partially based on user input; however, a full voltage assignment to all nets is ensured.

Figure 4:
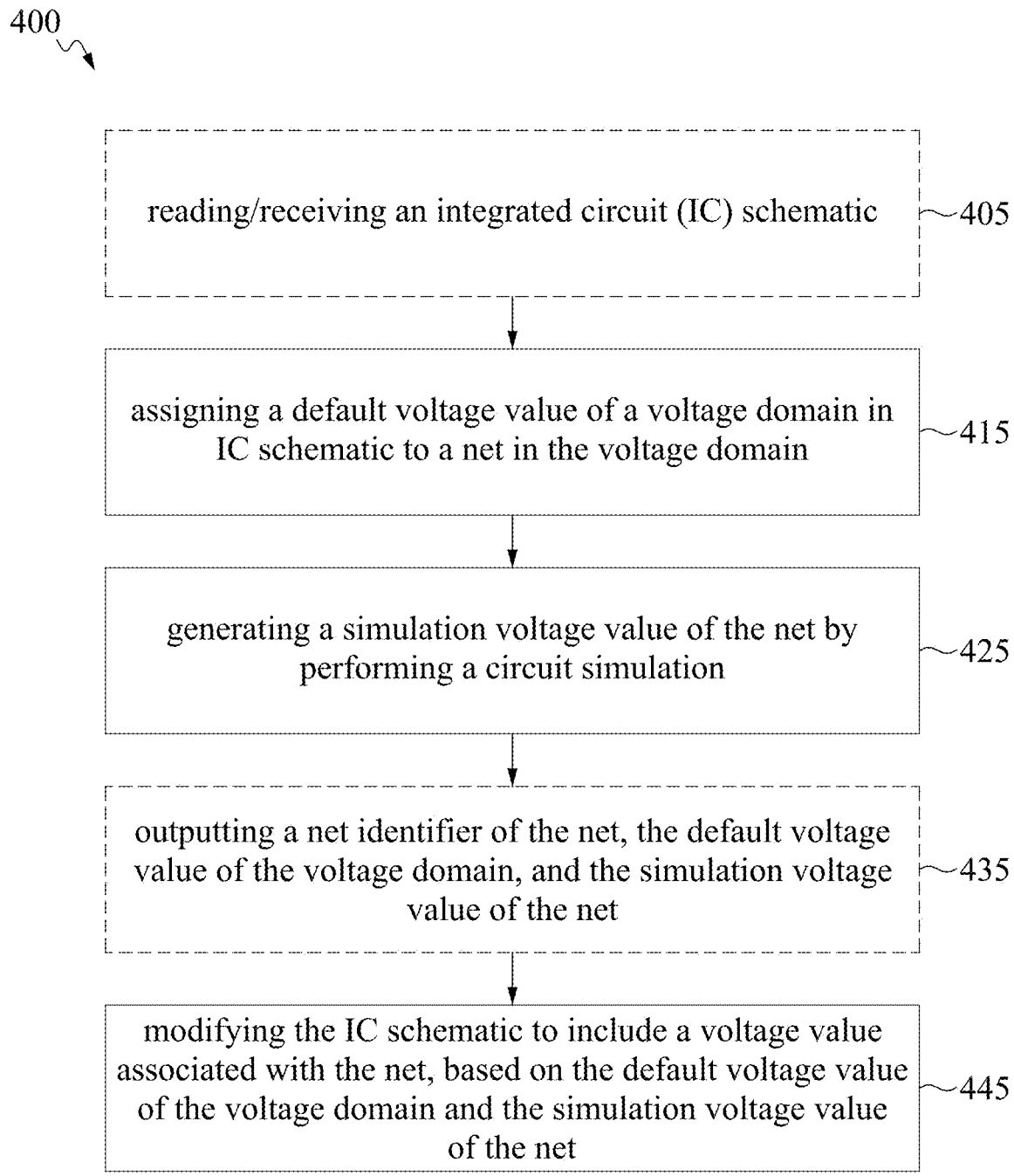
FIG. 4 is a flow chart of a various method, in accordance with some embodiments.

FIG. 4 is a flow chart of a method 400, in accordance with some embodiments. In at least one embodiment, method 400 is performed in whole or in part by a processor as described herein.

At operation 405, an IC schematic is read or received. In at least one embodiment, the IC schematic is received or read from a non-transitory, computer readable storage medium. Examples of an IC schematic are IC schematic 200 and IC schematic 300, as described with respect to FIGS. 2A and 3A, respectively. In at least one embodiment, operation 405 is omitted.

At operation 415, a default voltage value of a voltage domain in the IC schematic is assigned to a net in the voltage domain. For example, a default voltage value of 3.3V of a voltage domain VDD33 in IC schematic 300 is assigned to a net BG_OUT_1P2V in voltage domain VDD33, as described with respect to FIGS. 3A and 3B.

At operation 425, a simulation voltage value of the net is generated by performing a circuit simulation. For example, a simulation voltage value of 1.2V of net BG_OUT_1P2V is generated by performing a circuit simulation, as described with respect to FIG. 3B.

At operation 435, a net identifier of the net, the default voltage value of the voltage domain, and the simulation voltage value of the net are outputted. For example, a net identifier BG_OUT_1P2V, a default voltage value Vmax of 3.3V of corresponding voltage domain VDD33, and a simulation voltage value of 1.2V of net BG_OUT_1P2V are outputted at a corresponding row and in columns 350, 370, 372 of user interface 340, as described with respect to FIG. 3B.

In at least one embodiment, the net identifier, the default voltage value, and the simulation voltage value of the net are outputted in response to a difference between the default voltage value and the simulation voltage value of the net being greater than a predetermined tolerance. For example, in response to a difference between default voltage value Vmax of 3.3V and simulation voltage value of 1.2V of net BG_OUT_1P2V being greater than a predetermined tolerance, net identifier BG_OUT_1P2V, default voltage value Vmax of 3.3V, and simulation voltage value of 1.2V of net BG_OUT_1P2V are outputted to bring a user's attention to a fact that net BG_OUT_1P2V is an overkill net that needs voltage revision, as described with respect to FIG. 3B. In at least one embodiment, operation 435 is omitted.

At operation 445, the IC schematic is modified to include a voltage value associated with the net, based on the simulation voltage value of the net. For example, based on simulation voltage value of 1.2V of net BG_OUT_1P2V, IC schematic 300 is modified to include, in association with net BG_OUT_1P2V, a revised voltage value of 1.2V inputted in column 374 of user interface 340, as described with respect to FIG. 3B. In at least one embodiment, the revised voltage value (in column 374) is the same as the simulation voltage value (in column 372), as described with respect to user interface 340 in FIG. 3B. In at least one embodiment, the revised voltage value is different from the simulation voltage value as described herein.

In at least one embodiment, all operations 405, 415, 425, 435, 445 are automatically performed without user input or intervention.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, at least one method(s) discussed above is performed in whole or in part by at least one EDA system. In some embodiments, an EAD system is usable as part of a design house of an IC manufacturing system discussed below.

Figure 5:
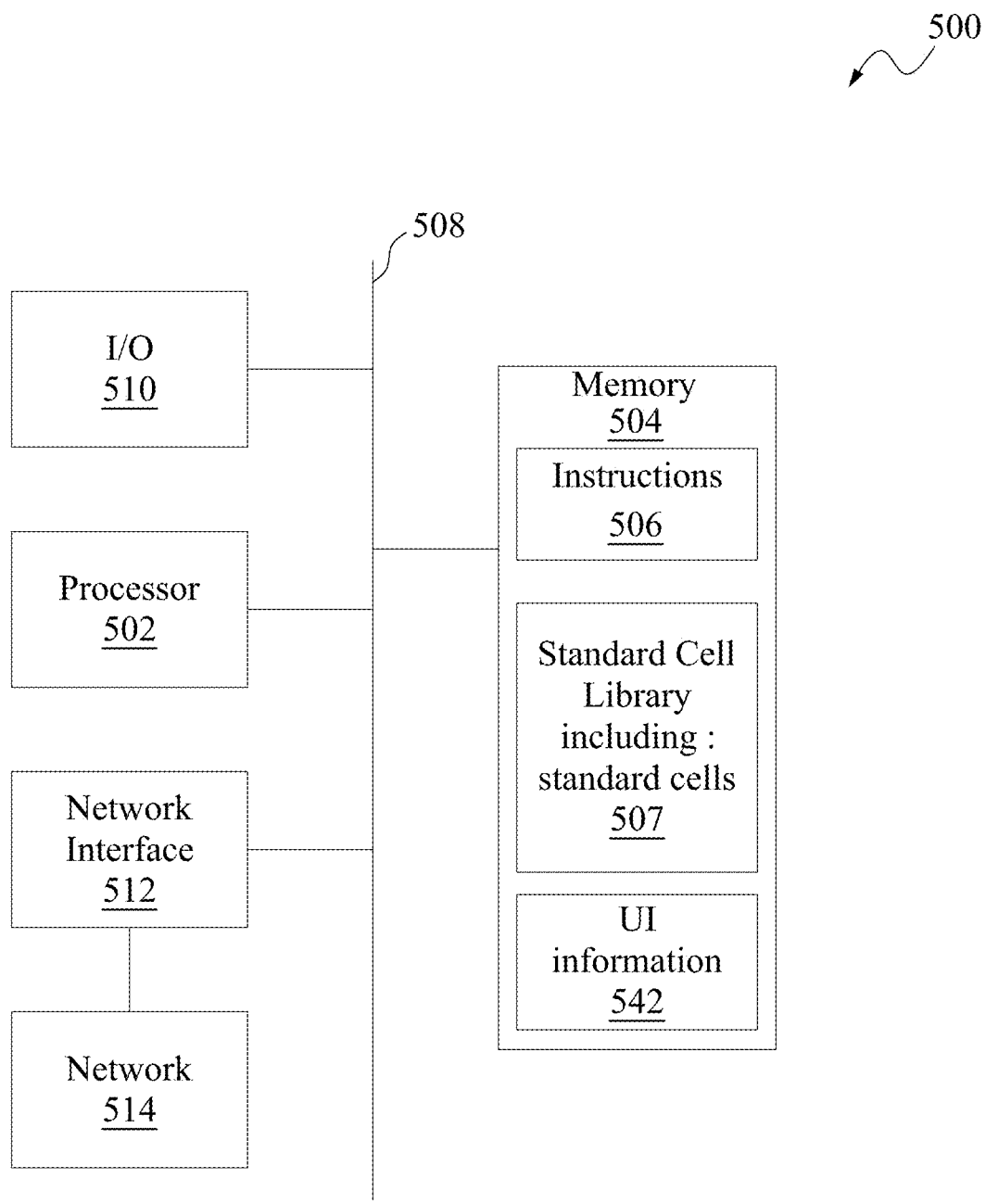
FIG. 5 is a block diagram of an EDA system, in accordance with some embodiments.

FIG. 5 is a block diagram of EDA system 500 in accordance with some embodiments. In some embodiments, EDA system 500 includes an automated placement and routing (APR) system.

In some embodiments, EDA system 500 is a general purpose computing device including a hardware processor 502 and a non-transitory, computer-readable storage medium 504. Storage medium 504, amongst other things, is encoded with, i.e., stores, computer program code 506, i.e., a set of executable instructions. Execution of instructions 506 by hardware processor 502 represents (at least in part) an EDA tool which implements a portion or all of, e.g., the methods described herein in accordance with one or more embodiments (hereinafter, the noted processes and/or methods).

Processor 502 is electrically coupled to computer-readable storage medium 504 via a bus 508. Processor 502 is also electrically coupled to an I/O interface 510 by bus 508. A network interface 512 is also electrically connected to processor 502 via bus 508. Network interface 512 is connected to a network 514, so that processor 502 and computer-readable storage medium 504 are capable of connecting to external elements via network 514. Processor 502 is configured to execute computer program code 506 encoded in computer-readable storage medium 504 in order to cause EDA system 500 to perform a portion or all of the noted processes and/or methods. In one or more embodiments, processor 502 is a central processing unit (CPU), a multiprocessor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause EDA system 500 (where such execution represents (at least in part) the EDA tool) to perform a portion or all of the noted processes and/or methods. In one or more embodiments, storage medium 504 also stores information which facilitates performing a portion or all of the noted processes and/or methods. In one or more embodiments, storage medium 504 stores a library 507 of standard cells.

EDA system 500 includes I/O interface 510. In one or more embodiments, I/O interface 510 includes an input device, an output device and/or a combined input/output device for enabling a user and/or external circuitry/equipment to interact with EDA system 500. An input device comprises, for example, a keyboard, keypad, mouse, trackball, trackpad, touchscreen, and/or cursor direction keys for communicating information and commands to processor 502. An output device comprises, for example, a display, a printer, a voice synthesizer, etc. for communicating information to a user.

EDA system 500 also includes network interface 512 coupled to processor 502. Network interface 512 allows EDA system 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 500.

EDA system 500 is configured to receive information through I/O interface 510. The information received through I/O interface 510 includes one or more of instructions, data, design rules, libraries of standard cells, and/or other parameters for processing by processor 502. The information is transferred to processor 502 via bus 508. EDA system 500 is configured to output to and/or receive information from a user through a user interface (UI). The UI comprises I/O interface 510 and information related to UI stored in computer-readable medium 504 as UI information 542.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 500. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 6:
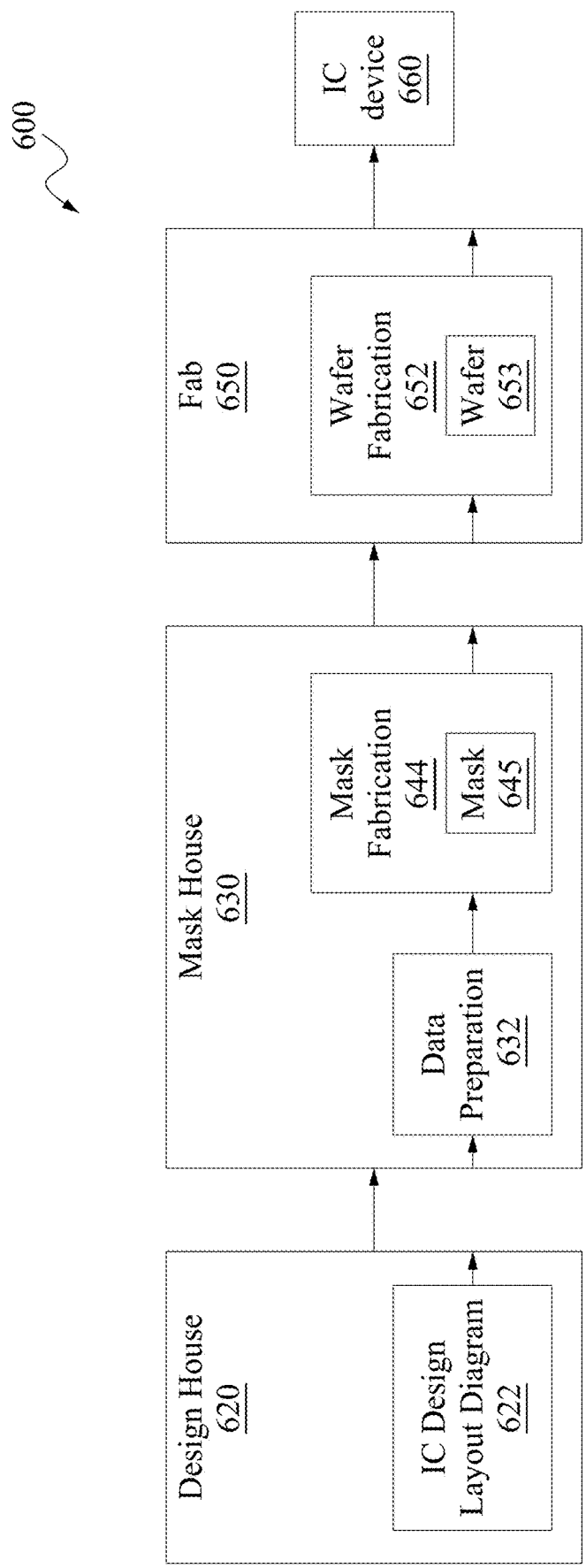
FIG. 6 is a block diagram of an IC manufacturing system and an IC manufacturing flow associated therewith, in accordance with some embodiments.

FIG. 6 is a block diagram of an integrated circuit (IC) manufacturing system 600, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 600.

In FIG. 6, IC manufacturing system 600 includes entities, such as a design house 620, a mask house 630, and an IC manufacturer/fabricator ("fab") 650, that interact with one another in the design, development, and manufacturing cycles and/or services related to manufacturing an IC device 660. The entities in system 600 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 620, mask house 630, and IC fab 650 is owned by a single larger company. In some embodiments, two or more of design house 620, mask house 630, and IC fab 650 coexist in a common facility and use common resources.

Design house (or design team) 620 generates an IC design layout diagram 622. IC design layout diagram 622 includes various geometrical patterns designed for IC device 660. The geometrical patterns correspond to patterns of metal, oxide, or semiconductor layers that make up the various components of IC device 660 to be fabricated. The various layers combine to form various IC features. For example, a portion of IC design layout diagram 622 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 620 implements a proper design procedure to form IC design layout diagram 622. The design procedure includes one or more of logic design, physical design or place and route. IC design layout diagram 622 is presented in one or more data files having information of the geometrical patterns. For example, IC design layout diagram 622 is expressed in a GDSII file format or DFII file format.

Mask house 630 includes data preparation 632 and mask fabrication 644. Mask house 630 uses IC design layout diagram 622 to manufacture one or more masks 645 to be used for fabricating the various layers of IC device 660 according to IC design layout diagram 622. Mask house 630 performs mask data preparation 632, where IC design layout diagram 622 is translated into a representative data file ("RDF"). Mask data preparation 632 provides the RDF to mask fabrication 644. Mask fabrication 644 includes a mask writer. A mask writer converts the RDF to an image on a substrate, such as a mask (reticle) 645 or a semiconductor wafer 653. The design layout diagram 622 is manipulated by mask data preparation 632 to comply with particular characteristics of the mask writer and/or requirements of IC fab 650. In FIG. 6, mask data preparation 632 and mask fabrication 644 are illustrated as separate elements. In some embodiments, mask data preparation 632 and mask fabrication 644 can be collectively referred to as mask data preparation.

In some embodiments, mask data preparation 632 includes optical proximity correction (OPC) which uses lithography enhancement techniques to compensate for image errors, such as those that can arise from diffraction, interference, other process effects and the like. OPC adjusts IC design layout diagram 622. In some embodiments, mask data preparation 632 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 632 includes a mask rule checker (MRC) that checks the IC design layout diagram 622 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 622 to compensate for limitations during mask fabrication 644, which may undo part of the modifications performed by OPC in order to meet mask creation rules.

In some embodiments, mask data preparation 632 includes lithography process checking (LPC) that simulates processing that will be implemented by IC fab 650 to fabricate IC device 660. LPC simulates this processing based on IC design layout diagram 622 to create a simulated manufactured device, such as IC device 660. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 622.

It should be understood that the above description of mask data preparation 632 has been simplified for the purposes of clarity. In some embodiments, data preparation 632 includes additional features such as a logic operation (LOP) to modify the IC design layout diagram 622 according to manufacturing rules. Additionally, the processes applied to IC design layout diagram 622 during data preparation 632 may be executed in a variety of different orders.

After mask data preparation 632 and during mask fabrication 644, a mask 645 or a group of masks 645 are fabricated based on the modified IC design layout diagram 622. In some embodiments, mask fabrication 644 includes performing one or more lithographic exposures based on IC design layout diagram 622. In some embodiments, an electron-beam (e-beam) or a mechanism of multiple e-beams is used to form a pattern on a mask (photomask or reticle) 645 based on the modified IC design layout diagram 622. Mask 645 can be formed in various technologies. In some embodiments, mask 645 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 645 includes a transparent substrate (e.g., fused quartz) and an opaque material (e.g., chromium) coated in the opaque regions of the binary mask. In another example, mask 645 is formed using a phase shift technology. In a phase shift mask (PSM) version of mask 645, various features in the pattern formed on the phase shift mask are configured to have proper phase difference to enhance the resolution and imaging quality. In various examples, the phase shift mask can be attenuated PSM or alternating PSM. The mask(s) generated by mask fabrication 644 is used in a variety of processes. For example, such a mask(s) is used in an ion implantation process to form various doped regions in semiconductor wafer 653, in an etching process to form various etching regions in semiconductor wafer 653, and/or in other suitable processes.

IC fab 650 includes wafer fabrication 652. IC fab 650 is an IC fabrication business that includes one or more manufacturing facilities for the fabrication of a variety of different IC products. In some embodiments, IC Fab 650 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 650 uses mask(s) 645 fabricated by mask house 630 to fabricate IC device 660. Thus, IC fab 650 at least indirectly uses IC design layout diagram 622 to fabricate IC device 660. In some embodiments, semiconductor wafer 653 is fabricated by IC fab 1050 using mask(s) 645 to form IC device 660. In some embodiments, the IC fabrication includes performing one or more lithographic exposures based at least indirectly on IC design layout diagram 622. Semiconductor wafer 653 includes a silicon substrate or other proper substrate having material layers formed thereon. Semiconductor wafer 653 further includes one or more of various doped regions, dielectric features, multi-level interconnects, and the like (formed at subsequent manufacturing steps).

Details regarding an integrated circuit (IC) manufacturing system (e.g., system 600 of FIG. 6), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method comprises assigning a default voltage value of a voltage domain in an integrated circuit (IC) schematic to a net in the voltage domain, generating a simulation voltage value of the net by performing a circuit simulation on the net, and modifying the IC schematic to include a voltage value associated with the net, based on the simulation voltage value of the net.

In some embodiments, a system comprises a user interface, and a processor. The processor is configured to assign a default voltage value of a voltage domain in an integrated circuit (IC) schematic to a net in the voltage domain. The processor is further configured to generate a simulation voltage value of the net by performing a circuit simulation on the net. The processor is further configured to, in response to a difference between the default voltage value of the voltage domain and the simulation voltage value of the net being greater than a predetermined tolerance, cause the user interface to output a net identifier of the net, the default voltage value of the voltage domain, and the simulation voltage value of the net. The processor is further configured to modify the IC schematic to include, in association with the net, a voltage value received via the user interface in response to the outputted default voltage value of the voltage domain and the outputted simulation voltage value of the net.

In some embodiments, a computer program product comprises a non-transitory, computer-readable medium containing instructions therein. The instructions, when executed by a processor, cause the processor to read an integrated circuit (IC) schematic. The IC schematic comprises a plurality of circuits in a plurality of voltage domains having different corresponding power supply voltages. Each circuit among the plurality of circuits comprises power supply nets coupled to power supply terminals of a corresponding voltage domain among the plurality of voltage domains to receive the power supply voltage of the corresponding voltage domain, and a signal net coupled to another circuit among the plurality of circuits. The instructions, when executed, further cause the processor to assign, to the signal net of each circuit among the plurality of circuits, the power supply voltage of the corresponding voltage domain. The instructions, when executed, further cause the processor to perform a circuit simulation on the IC schematic to obtain a simulation voltage at the signal net of each circuit among the plurality of circuits. The instructions, when executed, further cause the processor, in response to a difference between the assigned power supply voltage and the simulation voltage at the signal net of a circuit among the plurality of circuits being greater than a predetermined tolerance, to modify the IC schematic to include the simulation voltage in association with the signal net.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    assigning a default voltage value of a voltage domain in an integrated circuit (IC) schematic to a net in the voltage domain, wherein the default voltage value corresponds to a power supply voltage of the voltage domain;
    generating a simulation voltage value of the net by performing a circuit simulation on the net using the assigned default voltage value; and
    modifying the IC schematic to include a voltage value associated with the net, wherein, in response to a difference between the assigned default voltage value and the simulation voltage value of the net being greater than a predetermined tolerance, the voltage value associated with the net and included in the modified IC schematic is based on the simulation voltage value of the net.

2. The method of claim 1, further comprising:
reading the default voltage value from a file.

3. The method of claim 1, further comprising:
obtaining the default voltage value from a user interface.

4. The method of claim 1, wherein
the net is one net of a plurality of nets in the voltage domain,
said assigning comprises assigning the default voltage value of the voltage domain to all the plurality of nets in the voltage domain,
said generating comprises generating a simulation voltage value of each of the plurality of nets by performing the circuit simulation on the plurality of nets using the assigned default voltage value, and
said method further comprises causing a user interface to highlight, among the plurality of nets, those nets for each of which the difference between the assigned default voltage value and the simulation voltage value is greater than the predetermined tolerance.

5. The method of claim 1, further comprising:
in response to the difference between the assigned default voltage value and the simulation voltage value of the net being greater than the predetermined tolerance,
outputting a net identifier of the net, the assigned default voltage value, and the simulation voltage value of the net, and
receiving a user input of the voltage value to be included in the modified IC schematic, based on the outputted assigned default voltage value and the outputted simulation voltage value of the net.

6. The method of claim 1, wherein
the modifying the IC schematic comprises, in response to the difference between the assigned default voltage value and the simulation voltage value of the net being not greater than the predetermined tolerance,
including the assigned default voltage value as the voltage value associated with the net in the modified IC schematic.

7. The method of claim 1, wherein
the modifying the IC schematic comprises, in response to the difference between the assigned default voltage value and the simulation voltage value of the net being greater than the predetermined tolerance,
including the simulation voltage value as the voltage value associated with the net in the modified IC schematic.

8. The method of claim 1, further comprising:
storing the modified IC schematic in a non-transitory, computer readable storage medium.

9. The method of claim 1, further comprising:
generating a layout diagram corresponding to the modified IC schematic; and
performing a voltage design rule check (VDRC) on the generated layout diagram, the VDRC using the voltage value associated with the net and included in the modified IC schematic.

10. The method of claim 1, further comprising:
generating a layout diagram corresponding to the modified IC schematic; and
fabricating, based on the generated layout diagram, at least one of:
one or more semiconductor masks, or
at least one component in a layer of a semiconductor IC.

11. A system, comprising:
a user interface; and
a processor configured to
assign a default voltage value of a voltage domain in an integrated circuit (IC) schematic to a net in the voltage domain, wherein the default voltage value corresponds to a power supply voltage of the voltage domain,
generate a simulation voltage value of the net by performing a circuit simulation on the net using the assigned default voltage value, and
in response to a difference between the assigned default voltage value and the simulation voltage value of the net being greater than a predetermined tolerance,
cause the user interface to output a net identifier of the net, the assigned default voltage value, and the simulation voltage value of the net, and
modify the IC schematic to include, in association with the net, a voltage value received via the user interface in response to the outputted assigned default voltage value and the outputted simulation voltage value of the net.

12. The system of claim 11, wherein
the net is one net of a plurality of nets in the voltage domain, and
the processor is configured to
assign the default voltage value of the voltage domain to all the plurality of nets in the voltage domain,
generate a simulation voltage value of each of the plurality of nets by performing the circuit simulation on the plurality of nets using the assigned default voltage value, and
cause the user interface to highlight, among the plurality of nets, those nets for each of which the difference between the assigned default voltage value and the simulation voltage value is greater than the predetermined tolerance.

13. The system of claim 11, wherein
the voltage domain is one voltage domain of a plurality of voltage domains in the IC schematic, the plurality of voltage domains having different corresponding default voltage values and corresponding voltage domain identifiers, wherein the different default voltage values correspond to different corresponding power supply voltages of the plurality of voltage domains,
the net is one net of a plurality of nets, each net of the plurality of nets being part of a corresponding voltage domain of the plurality of voltage domains,
the processor is configured to
cause the user interface to output the voltage domain identifiers in association with the corresponding default voltage values,
in response to a user confirmation of the outputted default voltage values, assign the default voltage value of each voltage domain of plurality of voltage domains to the nets in the voltage domain,
perform the circuit simulation on all of the plurality of nets in the IC schematic using the corresponding assigned default voltage values, and
cause the user interface to highlight, among the plurality of nets, those nets for each of which the difference between the assigned default voltage and the simulation voltage value is greater than the predetermined tolerance.

14. The system of claim 11, wherein
the processor is configured to read the default voltage value from a common power format file.

15. The system of claim 11, wherein
the processor is configured to obtain the default voltage value input via the user interface.

16. The system of claim 11, wherein
the processor is configured to store the modified IC schematic in a non-transitory, computer readable storage medium.

17. The system of claim 11, wherein
the processor is configured to
generate a layout diagram corresponding to the modified IC schematic, and
perform a voltage design rule check (VDRC) on the generated layout diagram, the VDRC using the voltage value associated with the net and included in the modified IC schematic.

18. A computer program product, comprising a non-transitory, computer-readable medium containing instructions therein which, when executed by a processor, cause the processor to
read an integrated circuit (IC) schematic, wherein
the IC schematic comprises a plurality of circuits in a plurality of voltage domains having different corresponding power supply voltages, and
each circuit among the plurality of circuits comprises
power supply nets coupled to power supply terminals of a corresponding voltage domain among the plurality of voltage domains to receive the power supply voltage of the corresponding voltage domain, and
a signal net coupled to another circuit among the plurality of circuits,
assign, to the signal net of each circuit among the plurality of circuits, the power supply voltage of the corresponding voltage domain,
perform a circuit simulation on the IC schematic to obtain a simulation voltage at the signal net of each circuit among the plurality of circuits, and
in response to a difference between the assigned power supply voltage and the simulation voltage at the signal net of a circuit among the plurality of circuits being greater than a predetermined tolerance,
modify the IC schematic to include the simulation voltage in association with the signal net.

19. The computer program product of claim 18, wherein the instructions, when executed by the processor, further cause the processor to
receive a user input of at least one of
the power supply voltages of the plurality of voltage domains, or
a determination to modify the IC schematic to include the simulation voltage in association with the signal net at which the difference between the assigned power supply voltage and the simulation voltage is greater than the predetermined tolerance.

20. The computer program product of claim 18, wherein the instructions, when executed by the processor, further cause the processor to
generate a layout diagram corresponding to the modified IC schematic, and
perform a voltage design rule check (VDRC) on the generated layout diagram, the VDRC using the simulation voltage included in the modified IC schematic.

* * * * *